United States Patent [19]

Johnson et al.

[11] Patent Number: 5,457,951
[45] Date of Patent: Oct. 17, 1995

[54] IMPROVED LIQUEFIED NATURAL GAS FUELED COMBINED CYCLE POWER PLANT

[75] Inventors: Paul C. Johnson, Boston; A. Edwin Toombs, Charlestown, both of Mass.

[73] Assignee: Cabot Corporation, Boston, Mass.

[21] Appl. No.: 389,426

[22] Filed: Feb. 14, 1995

Related U.S. Application Data

[63] Continuation of Ser. No. 165,228, Dec. 10, 1993, abandoned.

[51] Int. Cl.[6] .............................. F02C 6/18; F02C 7/143
[52] U.S. Cl. .................. 60/39.02; 60/39.182; 60/39.465; 60/728
[58] Field of Search ................ 60/39.02, 39.182, 60/39.465, 728; 62/50.2, 50.3

[56] References Cited

U.S. PATENT DOCUMENTS

| | | | |
|---|---|---|---|
| 3,183,666 | 5/1965 | Jackson | 60/39.07 |
| 3,726,085 | 4/1973 | Arenson | 62/50.2 |
| 3,978,663 | 9/1976 | Mandrin et al. | 60/39.67 |
| 4,036,028 | 7/1977 | Mandrin | 62/52 |
| 4,330,998 | 5/1982 | Nozawa | 60/655 |
| 4,422,298 | 12/1983 | Nozawa | 60/655 |
| 4,429,536 | 2/1984 | Nozawa | 60/655 |
| 4,953,479 | 9/1990 | Keller et al. | 110/233 |
| 4,995,234 | 2/1991 | Kooy et al. | 60/648 |

OTHER PUBLICATIONS

Section 3.0 Description of the Project from the "Petition Before the Massachusetts Energy Facilities Council for Approval to Construct a Bulk Generating Facility Island End Cogeneration Project", dated Mar. 1991, prepared by Cabot Power Corporation et al. and submitted by Cabot Power Corporation.

*Primary Examiner*—Louis J. Casaregola

[57] ABSTRACT

A process and system which improves the capacity and efficiency of a combined cycle power plant. A LNG supply system fuels the combined cycle plant. Gasified LNG in a combustor mixes with the air from the air compressor to provide the hot combustion gas for the gas turbine. The expanding LNG is used to chill a primary heat exchange fluid, e.g. water, which primary heat exchange fluid cools and densifies the intake air for the air compressor. Subsequently, the primary heat exchange fluid is used to condense the spent steam discharged from the steam turbine. The primary heat exchange fluid is then re-chilled and recycled to cool and densify the intake air.

17 Claims, 1 Drawing Sheet

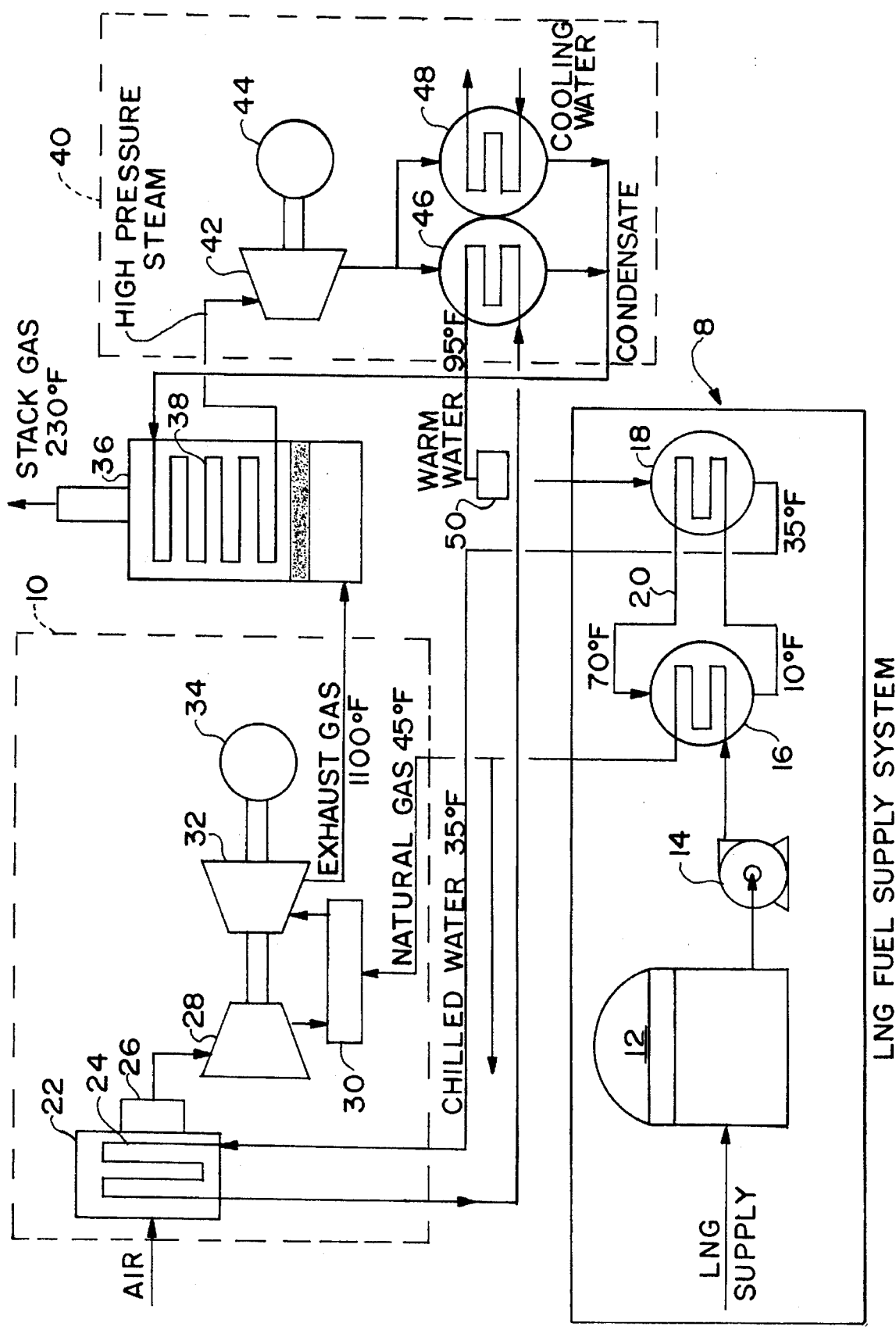

IMPROVED LIQUEFIED NATURAL GAS FUELED COMBINED CYCLE POWER PLANT

This is a continuation of applications Ser. No. 08/165,228, filed on Dec. 10, 1993, abandoned.

FIELD OF THE INVENTION

A method and system for using liquefied natural gas ("LNG") in combination with a combined cycle plant both to chill a heat exchange fluid which fluid is used to cool and densify the intake air for a gas turbine and to condense the spent steam from a steam turbine. The regasified LNG is used as fuel for the gas turbine and optionally for distribution to other power plants and natural gas distribution systems.

BACKGROUND AND BRIEF SUMMARY OF THE INVENTION

It is state of the art practice to extend a gas turbine plant with a waste-heat boiler and to combine the gas turbine plant with a steam turbine. The gas turbine and the steam turbine each drive their own generator or drive a single generator via a common shaft. These combination plants, referred to as combined cycle plants, are generally distinguished by their very good conversion efficiencies which range in the order of magnitude from 50 to 52%. These high efficiencies result from the cooperation of a gas turbine with at least one steam turbine circuit. The gas turbine exhaust gases are passed through the waste-heat boiler and the residual heat potential of these waste gases is utilized for producing the steam required for feeding the steam turbine. LNG has been used in combined cycle plants as a combustion energy source.

LNG is normally transported overseas as a cryogenic liquid in specialized vessels. At the receiving terminal this cryogenic liquid, which is approximately at atmospheric pressure and at a temperature of around −160° C., has to be regasified and fed to a distribution system at ambient temperature and at a suitably elevated pressure, typically ranging up to 80 atmospheres. The liquid is pumped to the required pressure so that when heat is added and it is regasified, no compression of the resultant natural gas is required.

Although many suggestions have been made and some installations have been built to utilize the large cold potential of LNG, in most receiving terminals the cold potential is wasted and the LNG is simply heated with a large flow of sea water which has to be applied in such a manner as to avoid ice formation.

For example, Mandrin et al., in U.S. Pat. No. 3,978,663, disclose a method for improving the efficiency of gas turbines by cooling the intake air with a liquid coolants. Air entering the intake portion to the turbine is filtered and chilled by cooling exchangers. Coolants such as freon, carry heat from the air to vaporize LNG through the exchangers. Methanol is introduced to the air by a mixing means as a deicer to prevent ice blockage in the exchanger, and is separated in a collecting means. The exhaust heat is used to vaporize water separated from the methanol and water mixture. In a subsequent patent Mandrin, in U.S. Pat. No. 4,036,028, discloses the use of multiple work liquids in conjunction with an open gas turbine system. The super cold from LNG is used to extract heat from the intake air by means of heat exchangers and a freon carrier fluid. An antifreeze liquid, such as methanol, is injected to prevent icing in the exchanger. The reference discloses a vapor turbine positioned in-line with a compressor.

A power generation system is also disclosed by Kooy et al., in U.S. Pat. No. 4,995,234. This patent discloses the chilling of intake air for a turbine, the warming of LNG by passing it against condensed carbon dioxide, and the use of a gas turbine exhaust system for heating a material used to drive a gas turbine.

Similarly, Nozawa, in U.S. Pat. Nos. 4,330,998, 4,429,536, and 4,422,298, discloses a liquefied natural gas-refrigerant electricity generating system. Generally, these patents teach a supply of freon being compressed and heated. The compressed/heated freon is then used to drive a high pressure turbine. The freon is heated again and passed through a low pressure turbine before being cooled in a heat exchanger against a nitrogen and/or LNG stream.

Combined gas and steam power plants are disclosed by Woolley, in U.S. Pat. No. 3,605,405, and Keller et al., in U.S. Pat. No. 4,953,479. The Keller reference particularly discloses methacoal integrated combined cycle power plants using a gas turbine and steam turbine system where the exhaust from the gas turbine system is used to produce steam to drive the steam turbine. The used steam is then condensed and reheated by the exhaust system.

None of the foregoing, or other power generation systems utilizing LNG, address the problem of maximizing the efficiency and capacity of a gas powered turbine. More particularly, none of the references address maximizing the efficiency and capacity of a gas powered turbine in warm climates, wherein the peak electrical consumption occurs when the air temperature is at its highest. Typically, the efficiency and capacity of gas turbine decreases with increasing air temperature.

It is therefore an object of this invention to provide a cogeneration system for generating electricity and gaseous hydrocarbon from a liquefied cryogenic material such as LNG.

A further object of this invention is to provide a cogeneration system which utilizes a liquefied cryogenic material, such as LNG, to densify (by reducing the air temperature) the intake air to maximize the efficiency and capacity of a gas turbine in warm climates.

The invention broadly embodies a system and process which improves the capacity of a combined cycle plant in an amount up to 9% and the efficiency of the plant up to about 2%, particularly when the ambient temperature exceeds 60° F. A LNG fuel supply system is used in combination with a combined cycle plant. The combined cycle plant comprises a gas turbine plant, a waste-heat boiler and a steam turbine plant. A primary heat exchange fluid is chilled in the LNG fuel supply system and is then utilized in the gas turbine process to cool and densify the intake air to the gas turbine. The primary heat exchange fluid is also utilized in the steam turbine process to condense the spent steam from the steam turbine. Lastly, the primary heat exchange fluid is recycled to the LNG fuel supply system where it is rechilled. The primary heat exchange fluid flows through a closed loop while cooling and densifying the intake air, while condensing the steam discharged from the steam turbine and when being rechilled in the LNG fuel supply system.

The LNG fuel supply system comprises the LNG supply, a regasifier and a chiller. In the LNG fuel supply system is a secondary heat exchange fluid which flows through a closed loop. The secondary heat exchange fluid is in heat exchange relationship with both the regasifier where the LNG is converted to natural gas, and the chiller where the primary heat exchange fluid is chilled. The natural gas is used, in part, as the fuel for the combustor in the gas turbine plant. The secondary heat exchange fluid is cooled in the gasifier, by the expanding LNG, and chills the primary heat exchange fluid in the chiller. The LNG is regasified without the use of expensive sea water regasifiers and/or without the need for using fuel for the heat source.

In a preferred embodiment of the invention, the primary heat exchange fluid, water, flows through the water chiller (heat exchanger) in the LNG fuel supply system. The secondary heat exchange fluid, a water/glycol mixture, chills the primary heat exchange fluid which primary heat exchange fluid then flows to a heat exchanger in the gas turbine plant. The gas turbine plant, which is fueled by the regasified LNG, drives a generator. The gas turbine plant has an air intake duct, a heat exchanger, a water separator, an air compressor, a combustor, a gas turbine and an exhaust port. The heat exchanger is positioned within the air intake duct. The primary heat exchange fluid flows through the heat exchanger and supplies a chilled refrigerant stream for densification and cooling of the air intake stream to the air compressor.

A waste-heat boiler is downstream of and in communication with the exhaust port of the gas turbine. The exhaust of the gas turbine converts a stream of water flowing through the boiler into high pressure steam.

The steam turbine plant comprises a steam turbine and a condenser for spent steam. The high pressure steam from the boiler is used to drive the steam turbine. The spent steam from the turbine flows into a condenser. The primary heat exchange fluid flows through the condenser and condenses the spent steam. The primary heat exchange fluid then returns and flows through the chiller in the LNG fuel supply system.

BRIEF DESCRIPTION OF THE DRAWINGS

The drawing is a process flow diagram of a system embodying the invention.

DESCRIPTION OF THE PREFERRED EMBODIMENT(S)

Referring to the drawing, a system embodying the invention comprises a liquefied natural gas (LNG) fuel supply system 8, and a combined cycle power station plant which comprises a gas turbine plant 10, a steam turbine plant 40 and a waste-heat boiler 36 interposed between the two plants. Circulating pumps for heat exchange fluids are not shown.

The LNG fuel supply system 8 comprises a supply tank 12, a pump 14, a regasifier 16 and a chiller (heat exchanger) 18. A closed loop 20 provides for fluid flow communication of a water/glycol mixture between the regasifier 16 and the chiller 18. Natural gas from the regasifier 16 flows to the gas turbine plant 10 and to other power plants and/or to a natural gas distribution system. The gas turbine plant comprises an air intake duct 22, a heat exchanger 24 received therein and a downstream water and particulate filter 26 upstream of an air compressor 28.

Water from the chiller 18 in the LNG fuel supply system 8 flows through the heat exchanger 24. The intake air flows across the heat exchanger and is cooled and densified. The cooled densified air flows into the air compressor 28.

A combuster 30 receives the intake air from the air compressor 28, mixes it with the natural gas from the regasifier 16 and delivers the hot combustion gases to the gas turbine 32.

The combustion gases drive the gas turbine 32 and an associated generator 34. Preferably, the air compressor 28, gas turbine 32 and generator 34 are mounted on the same drive shaft.

The exhaust gas from the gas turbine 32 exhausts to a waste-heat boiler 36 where water flowing through a coil 38 is converted to high pressure steam.

The steam turbine plant 40 comprises a steam turbine 42 with an associated generator 44; both the steam turbine 42 and the generator 44 preferably being mounted on the same drive shaft. Alternatively, a larger single electric generator could be mounted on a common shaft with the gas turbine and steam turbine. Downstream of the turbine 42 is a condenser 46 through which the primary heat exchange fluid flows. In the event the LNG fuel supply system is off-line or is inadequate for the required cooling duty, an auxiliary condenser 48 is provided. The condenser 46 condenses the output (spent steam) from the steam turbine 42 which output is recycled back to the waste-heat boiler 36. The primary heat exchange fluid flows back to the chiller 18.

In the preferred embodiment, the flow of the primary and secondary fluids are each within a closed loop. Water is used as the primary heat exchange fluid within the combined cycle plant and between the LNG fuel supply system and the combined cycle plant. The water is maintained at a temperature above freezing at all times, and is treated, as necessary, to inhibit corrosion.

If the LNG regasifier is not operating, the combined cycle plant can operate independently of the LNG regasifier by providing enough external cooling water to handle the entire condensing load. If the combined cycle plant is not operating, the LNG regasifier can operate independently of the combined cycle plant by providing external standby heaters for heating the circulating water.

The secondary heat exchange fluid, e.g. water/glycol is used to avoid the potential for freezing pure water in the LNG fuel supply system. The water which is warmed in the combined cycle plant to 95° F. or more is used to heat the secondary fluid to some temperature sufficient to regasify the LNG, e.g. 70° F. This water is in turn chilled by the secondary fluid to a low temperature, e.g. 35° F., and returned to the combined cycle plant to precool the turbine combustion air.

The regasifier 16 and chiller 18 (heat exchangers) in the LNG regasification system are counter-current and use a minimum approach temperature of 25° F. The wall temperature at the cold end is somewhat below 32° F. and a thin layer of ice will reduce the transfer coefficient enough to raise the outside of the ice to 32° F.

| water in | 95° F. (from condenser 46) |
|---|---|
| water/glycol out | 70° F. (95-25) |
| water out | 35° F. (to heat exchanger 24) |
| water/glycol in | 10° F. (35-25) |

| water/glycol in | 70° F. (from water chiller 18) |
|---|---|
| natural gas out | 45° F. (70-25) |
| water/glycol out | 10° F. (to water chiller 18) |

The water temperature out of the chiller 18 is controlled by modulating a control valve (not shown) on the water outlet stream thereby reducing the water flow rate as the available refrigeration decreases, i.e. the LNG flow rate decreases. The water inlet temperature is controlled by the combined cycle plant.

The LNG fuel supply system can provide large quantities of refrigeration for the combined cycle plant cooling as well as for internal cooling. Conversely the combined cycle plant can provide large quantities of heat to the LNG fuel supply system with no decrease in combined cycle plant performance. The water circulating between the combined cycle plant and the LNG fuel supply system makes this possible. The secondary fluid makes it possible to use water at the low temperatures described.

Warm water from the combined cycle plant goes into a large tank 50 which acts as a "fly-wheel", from which the warm water is pumped to the chiller 18. This warm water can also be used for any other place where "low grade" heat, e.g. 95° F. or lower, is required. Standby heaters (not shown) can be used to keep the water warm enough to provide the required heat if it is not available from the combined cycle plant.

Water which is chilled in the chiller 18 is used primarily for precooling the combustion air for the turbine 32. The chilled water can also be used for various plant cooling duties, including any place where "low grade" refrigeration, e.g. 35° F. or higher, is required. Excess refrigeration is soaked up in the steam condenser.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

What is now claimed is:

1. A method for enhancing the capacity and the efficiency of a combined cycle plant which comprises:

regasifying LNG to convert to natural gas;

chilling a primary heat exchange fluid by placing said primary heat exchange fluid in heat exchange relationship with a secondary heat exchange fluid which secondary heat exchange fluid is cooled by the conversion of the LNG to the natural gas;

flowing the chilled primary heat exchange fluid through a heat exchange zone through which zone flows the intake air for an air compressor to cool and densify the intake air;

flowing subsequently the primary heat exchange fluid through a condenser to condense the spent steam from a high-pressure steam turbine; and placing subsequently the primary heat exchange fluid in heat exchange relationship with the secondary heat exchange fluid.

2. The method of claim 1, which comprises:

compressing the cooled densified air in the air compressor;

mixing the regasified LNG with the compressed air in a combustor to form hot combustion gases;

delivering the hot combustion gases to a gas turbine to drive the turbine; and discharging the exhaust gas from the turbine.

3. The method of claim 2, which comprises:

flowing the exhaust gas from the gas turbine to a waste-heat boiler;

flowing a liquid through the waste-heat boiler;

placing the exhaust gas in heat exchange relationship with the liquid to convert the liquid to high pressure steam; and discharging the high pressure steam from the waste-heat boiler.

4. The method of claim 3, which comprises:

flowing the high pressure steam to the steam turbine;

discharging spent steam from the steam turbine;

condensing the spent steam to form condensed water with the primary heat exchange fluid;

chilling subsequently the primary heat exchange fluid by placing the primary heat exchange fluid in heat exchange relationship with the secondary fluid.

5. The method of claim 1 which comprises:

improving the capacity of the combined cycle plant in an amount of up to 9%.

6. The method of claims 1 or 5 which comprises:

enhancing the efficiency of the combined cycle plant up to about 2%.

7. A method for enhancing the capacity and efficiency of a combined cycle plant which combined cycle plant comprises a gas turbine plant, a waste-heat boiler, a steam turbine plant and a LNG supply system, the LNG supply system comprising a regasifier and a chiller in heat exchange relationship with one another which method comprises:

regasifying the LNG in the regasifier to convert the same to natural gas;

flowing a primary heat exchange fluid through the chiller;

flowing a secondary heat exchange fluid between the regasifier and the chiller both to control the gasification of the LNG and the chilling of the primary heat exchange fluid;

flowing the gasified LNG to a combustor in the gas turbine plant;

flowing the chilled primary heat exchange fluid through a heat exchange zone through which zone flows the intake air for an air compressor in the gas turbine plant, the primary heat exchange fluid cooling and densifying the intake air;

discharging the air from the air compressor and mixing the same with the gasified LNG in the combustor to generate hot combustion gases;

flowing the hot combustion gases to a turbine in the gas turbine plant to drive the same;

discharging hot exhaust gases from the turbine and flowing the same to the waste-heat boiler;

convening liquid flowing through the waste-heat boiler to steam and discharging said steam;

flowing the discharged stream to a steam turbine in the steam turbine plant to drive the same and to form spent steam;

flowing the spent steam through a condenser;

flowing the primary heat exchange fluid from the heat exchange zone upstream of the air compressor through the condenser to condense the spent steam; and flowing the primary heat exchange fluid from the condenser to the chiller in the LNG supply system.

8. The method of claim 7 which comprises:

placing the primary heat exchange fluid in indirect heat exchange relationship with the intake air.

9. The method of claim 7 wherein the primary heat exchange fluid is water.

10. The method of claim 9 wherein the temperature of the water entering the chiller is approximately 95° F. and the temperature of the water exiting the chiller is about 35° F.

11. The method of claim 7 wherein the secondary heat exchange fluid is a water/glycol mixture.

12. The method of claim 11 wherein the water/glycol mixture enters the regasifier at about 70° F. and exits the gasifier at about 10° F.

13. The method of claim 11 wherein the temperature of the water/glycol entering the regasifier is about 70° F., the water/glycol mixture exiting the regasifier is about 10° F. and the natural gas exiting the regasifier is about 45° F.

14. The method of claim 7 which comprises:

improving the capacity of the combined cycle plant in an amount of up to 9%.

15. The method of claim 7 which comprises:

enhancing the efficiency of the combined cycle plant up to about 2%.

16. A LNG combined cycle plant system which comprises:

a LNG fuel supply system which system includes:
a source of LNG;
a regasifier for the LNG in fluid flow communication with source of LNG;
a chiller in heat exchange relationship with the regasifier;
means to flow a secondary heat exchange fluid between the regasifier and
the chiller to chill a primary heat exchange fluid;
a gas turbine plant which comprises:
an air compressor;
an air intake duct upstream of said air compressor;
a second heat exchanger disposed in heat exchange relationship with the air intake system;
means to flow the primary heat exchange fluid through the heat exchanger to cool and densify the intake air flowing through the air duct and into the compressor;
a gas turbine;
a combuster interposed between the air compressor and the gas turbine, the combuster providing the energy to drive the gas turbine;
a generator coupled to the gas turbine; and
means to exhaust the gas from the gas turbine;
a waste-heat boiler downstream of the gas turbine which comprises;
means to introduce the exhaust gas from the gas turbine into the waste-gas boiler;
means to create high pressure steam and
means to discharge the high pressure steam from the waste-heat boiler;
a steam turbine plant which comprises:
a steam turbine downstream of and adapted to receive the high pressure steam from the waste-heat boiler;
a generator coupled to and driven by the steam turbine;
a condenser to condense the spent steam discharged from the steam turbine the primary heat exchange fluid flowing through the condenser;
means to recycle the condensate to the waste-heat boiler; and
means to flow the primary heat exchange fluid from the condenser to the chiller.

17. The system of claim 16 which includes:

means to place the primary heat exchange fluid in indirect heat transfer relationship with the intake air.

* * * * *